US009488670B2

United States Patent
Chan et al.

(10) Patent No.: US 9,488,670 B2
(45) Date of Patent: Nov. 8, 2016

(54) SYSTEMS AND METHODS FOR DETECTING OVERHEAD LINE MOTION

(71) Applicant: Elwha LLC, Bellevue, WA (US)

(72) Inventors: Alistair K. Chan, Bainbridge Island, WA (US); Jesse R. Cheatham, III, Seattle, WA (US); Geoffrey F. Deane, Bellevue, WA (US); William Gates, Medina, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Robert C. Petroski, Seattle, WA (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/553,449

(22) Filed: Nov. 25, 2014

(65) Prior Publication Data
US 2015/0075282 A1 Mar. 19, 2015

Related U.S. Application Data

(63) Continuation of application No. 13/675,726, filed on Nov. 13, 2012.

(51) Int. Cl.
| | | |
|---|---|---|
| *G01P 15/00* | (2006.01) | |
| *G01H 17/00* | (2006.01) | |
| *H02G 7/14* | (2006.01) | |
| *H02G 7/18* | (2006.01) | |

(52) U.S. Cl.
CPC ............... *G01P 15/00* (2013.01); *G01H 17/00* (2013.01); *H02G 7/14* (2013.01); *H02G 7/18* (2013.01)

(58) Field of Classification Search
CPC ........ G01P 15/00; G01H 17/00; H02G 7/14; H02G 7/18; H02G 7/02; H02G 7/00; H02G 1/04; H02G 1/02; G01C 9/00; G01B 13/12; G01B 17/00
See application file for complete search history.

(56) References Cited

U.S. PATENT DOCUMENTS

| | | | |
|---|---|---|---|
| 4,728,887 A | 3/1988 | Davis | |
| 6,205,867 B1 * | 3/2001 | Hayes | ..................... G01C 9/00 73/862.391 |
| 6,523,424 B1 | 2/2003 | Hayes et al. | |

(Continued)

OTHER PUBLICATIONS

PCT International Search Report; International App. No. PCT/US2013/069811; Feb. 25, 2014; pp. 1-3.

(Continued)

*Primary Examiner* — Manuel L Barbee
(74) *Attorney, Agent, or Firm* — Foley & Lardner LLP

(57) ABSTRACT

A system for monitoring motion of an overhead line includes a monitoring device. The monitoring device includes an accelerometer and a processing circuit. The processing circuit is configured to accept data from the accelerometer corresponding to line movement, analyze the data to determine displacement data corresponding to a displacement of the overhead line, accept data corresponding to a location of at least one external object proximate to the overhead line, and analyze the displacement data to determine a clearance from the at least one external object.

30 Claims, 8 Drawing Sheets

(56) References Cited

U.S. PATENT DOCUMENTS

| | | |
|---|---|---|
| 7,369,045 B2 | 5/2008 | Hansen |
| 7,733,094 B2 | 6/2010 | Bright et al. |
| 2006/0060007 A1 | 3/2006 | Mekhanoshin et al. |
| 2006/0125469 A1 | 6/2006 | Hansen |
| 2006/0195307 A1 | 8/2006 | Huang et al. |
| 2008/0297162 A1 | 12/2008 | Bright et al. |
| 2009/0243876 A1 | 10/2009 | Lilien et al. |
| 2011/0101783 A1 | 5/2011 | Hoffman |
| 2011/0238374 A1 | 9/2011 | Lancaster |
| 2012/0029871 A1 | 2/2012 | Spillane |
| 2012/0046799 A1 | 2/2012 | Alex et al. |
| 2012/0278011 A1* | 11/2012 | Lancaster ............ H02G 1/02 702/57 |
| 2014/0021327 A1* | 1/2014 | Hyde ................. H02G 7/08 248/636 |

OTHER PUBLICATIONS

European Patent Office, Supplementary European Search Report, Pursuant to Rule 62 EPC; App. No. EP 13854953; Jun. 6, 2016 (received by our Agent on Jun. 21, 2016); pp. 1-7.

* cited by examiner

SYSTEMS AND METHODS FOR DETECTING OVERHEAD LINE MOTION

CROSS-REFERENCE TO RELATED PATENT APPLICATIONS

This application is a continuation of U.S. application Ser. No. 13/675,726, filed Nov. 13, 2012, which is incorporated herein by reference in its entirety.

BACKGROUND

Overhead lines (e.g., transmission lines, power lines, suspended lines, etc.) tend to oscillate back and forth. The oscillations often include high-amplitude, low-frequency oscillations of the line due to wind. The oscillations occur most often in the vertical plane, although horizontal and rotational motions are also possible. The oscillations of the line cause fatigue problems both within the line and to any structures to which the line is coupled. In the case of power lines, the oscillations add significantly to the stress on coupled insulators and pylons, which raises the risk of mechanical failure of the power system. Additionally, the oscillations can have amplitudes that are sufficient to exceed operating clearances.

SUMMARY

One exemplary embodiment relates to a system for monitoring motion of an overhead line. The system includes a monitoring device, including an accelerometer and a processing circuit. The processing circuit is configured to accept data from the accelerometer corresponding to line movement, analyze the data to determine displacement data corresponding to a displacement of the overhead line, accept data corresponding to a location of at least one external object proximate to the overhead line, and analyze the displacement data to determine a clearance from the at least one external object.

Another exemplary embodiment relates to a method of monitoring line motion. The method includes receiving data from an accelerometer corresponding to movement of an overhead line, analyzing the data to determine displacement data corresponding to a displacement of the overhead line, receiving data corresponding to a location of at least one external object proximate to the overhead line, and analyzing the displacement data to determine a clearance from the at least one external object.

Another exemplary embodiment relates to a system for detecting a structural failure of an overhead line. The system includes a monitoring device, including an accelerometer and a processing circuit. The processing circuit is configured to accept data from the accelerometer corresponding to line movement, analyze the data to determine distance excursion data, analyze the distance excursion data to detect a falling line, and responding to the falling line with a real-time action.

Another exemplary embodiment relates to a method of detecting a structural failure of a power line. The method includes receiving data from an accelerometer corresponding to movement of a power line, analyzing the data to determine distance excursion data, analyzing the distance excursion data to determine whether the power line is falling, and responding to a falling power line with a real-time action.

Another exemplary embodiment relates to a system for actively damping motion of an overhead line. The system includes a monitoring device, including an accelerometer, a damping device configured to reduce motion of the overhead line, and a processing circuit. The processing circuit is configured to accept data from the accelerometer corresponding to line movement, analyze the data to determine displacement data corresponding to a displacement of the overhead line, analyze the displacement data to determine if the overhead line needs damping, and deliver control data to the damping device, wherein the damping device is configured to receive the control data and produce overhead line damping according to the control data.

Another exemplary embodiment relates to a method of actively damping overhead line movement. The method includes receiving data from an accelerometer corresponding to movement of an overhead line, analyzing the data to determine displacement data corresponding to a displacement of the overhead line, analyzing the displacement data to determine if the overhead line needs damping, delivering control data to a damping device configured to reduce motion of the overhead line, wherein the control data is configured to control overhead line damping, and damping the overhead line using the damping device.

Another exemplary embodiment relates to a non-transitory computer-readable medium having instructions stored thereon, the instructions include instructions to accept data from an accelerometer corresponding to movement of an overhead line, instructions to determine displacement data corresponding to a displacement of the overhead line, instructions to accept data corresponding to a location of at least one external object proximate to the overhead line, instructions to analyze the displacement data, and instructions to determine a clearance from the at least one external object.

The invention is capable of other embodiments and of being carried out in various ways. Alternative exemplary embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1A:
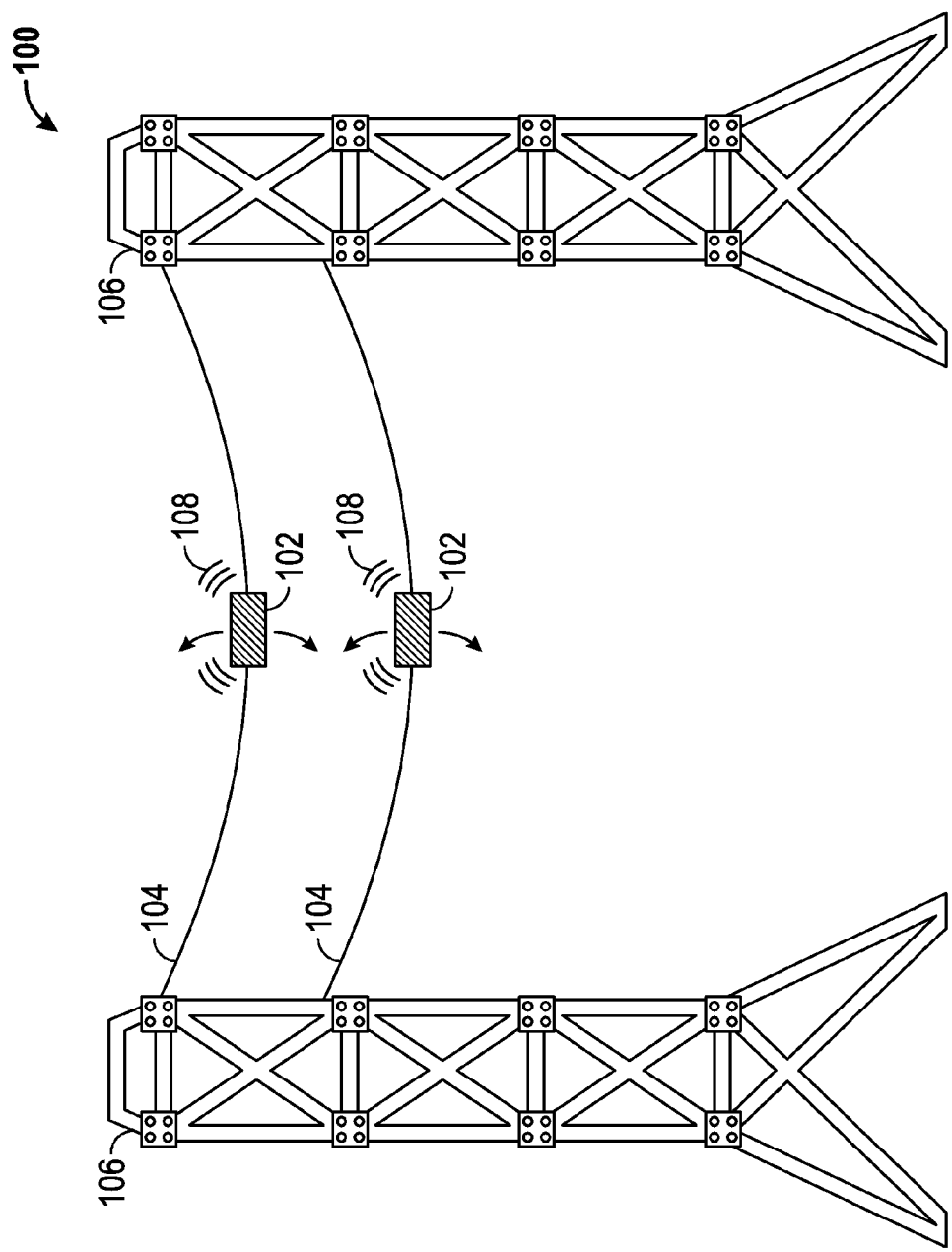
FIG. 1A is a schematic diagram of an acceleration sensor system for monitoring line motion, including an monitoring device, suspended power lines, and power transmission towers, shown according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, systems and methods for using an acceleration sensor to detect line motion are shown and described. A monitoring device containing an acceleration sensor, transmitter, and processing circuit may be coupled to a power line. The monitoring device may be powered by the power line. The power line may be suspended between two or more transmission towers (e.g., electricity pylons, lattice towers, suspension towers, terminal towers, tension towers, transposition towers, etc.). The transmission tower may utilize insulators, or other appropriate means of coupling the lines to the tower's arms. In the event of a gust of wind which induces an oscillation within the suspended power line, the acceleration sensor detects the oscillation and provides related data to the processing circuit. The processing circuit analyzes the data and determines line clearances from external objects. The external objects may include trees, structures, other power lines, buildings, etc. The processing circuit determines clearances between the line and the external objects based on variations of displacement along the length of the line, in addition to determining amplitude information. The processing circuit measures and predicts the actual shape the displacement due to the oscillation. For example, the displacement may be larger towards the middle of the line, and lower towards the support ends to which the line is coupled. The processing circuit may cause the transmitter to send oscillation and clearance information to a receiving device. The oscillation and clearance information may be logged, and later used in determining a need to trim vegetation, sculpt terrain, decrease cable sag, etc. The processing circuit may also determine to take real-time action based on the oscillation and clearance data. For example, if the processing circuit determined that the line is within a certain distance to an external object, the action may include reducing a power transmission or depowering the line.

In another contemplated scenario, the monitoring device includes a receiver configured to receive data from a control center or other monitoring devices. The monitoring device may use received oscillation data in calculating displacements along the line. As an example, there may be four monitoring devices along a particular span of line. The monitoring device may receive oscillation information from the other three monitoring devices, and integrate their motion to determine displacements.

According to another contemplated scenario a monitoring device containing an acceleration sensor, transmitter, and processing circuit is coupled to a power line. The power line is suspended between two or more transmission towers (e.g., electricity pylons, lattice towers, suspension towers, terminal towers, tension towers, transposition towers, etc.). The transmission tower may utilize insulators, or other appropriate means of coupling the lines to the tower's arms. In the event of a gust of wind or other occurrence which causes a failure within the power line (e.g., a falling line, line breakage, falling tower, structural failure, etc.), the acceleration sensor detects the falling line and provides relevant data to the processing circuit. The processing circuit analyzes the data and may calculate a predicted time-to-ground impact. The processing circuit may also determine an actual impact time. The processing circuit may also determine to take real-time action based on failure. For example, the action may include depowering the line prior to impact, or after impact. As another example, the action may include using the transmitter to send a status signal to a control center. As yet another example, the action may include using the transmitter to send a warning signal to other load devices, notifying the devices of an imminent power loss or power surge.

According to another contemplated scenario a monitoring device containing an acceleration sensor, transmitter, and processing circuit is coupled to a power line. The power line is suspended between two or more transmission towers (e.g., electricity pylons, lattice towers, suspension towers, terminal towers, tension towers, transposition towers, etc.). The transmission tower may utilize insulators, or other appropriate means of coupling the lines to the tower's arms. In the event of a gust of wind or other occurrence which induces an oscillation within the power line, the acceleration sensor detects the oscillation and provides relevant data to the processing circuit. The processing circuit analyzes the data and may determine to counter act the oscillations. This may include using the transmitter to send signals to control damping devices. For example, the damping devices may include line tensioners or other means of adjusting line tension, dynamic force couplers to external structures, fans or other aerodynamic devices, or controlled magnetic devices (e.g., devices which react with line current), each configured to counteract an oscillating line.

For purposes of this disclosure, the term "coupled" means the joining of two members directly or indirectly to one another. Such joining may be stationary in nature or moveable in nature and such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1A, line motion detection system 100 is shown according to an exemplary embodiment. Line motion detection system 100 includes monitoring device 102, power lines 104, transmission towers 106, and transmission signals 108. Transmission towers 106 may be electricity pylons, lattice towers, suspension towers, terminal towers, tension towers, transposition towers, or any other structures used to support overhead lines. Power lines 104 may be transmission or distribution lines, high voltage AC lines, high voltage DC lines, or any other type of overhead line. Monitoring devices 102 are devices configured according to the systems and methods herein. Monitoring devices 102 include accelerometers, processing circuits, transmitters, and any other components necessary to couple monitoring devices 102 to the lines. Monitoring devices 102 may additionally include receivers, or components necessary to implement a crowbar circuit. The transmitters of monitoring devices 102 are depicted as sending transmission signals 108. The transmission signals 108 may include information about line oscillations, information about calculated line clearances, warning information, status information, or any other relevant information. Transmission signals 108 may be received by any multitude of devices. For example, receiving devices may include receivers located at a control center, receivers mounted on transmission towers 106, or other monitor devices 102, etc. It should be understood that the scope of the present disclosure is not limited to a certain number, or arrangement of monitoring devices 102. For example, a line may have multiple monitoring devices 102 coupled thereto. As another example, monitoring devices 102 may be coupled to a tower arm connected to the line, or any other feasible location on transmission towers 106. As another example, the monitoring device may not have on-board processing circuits, but instead transmit accelerometer data to an external processing circuit.

Figure 1B:
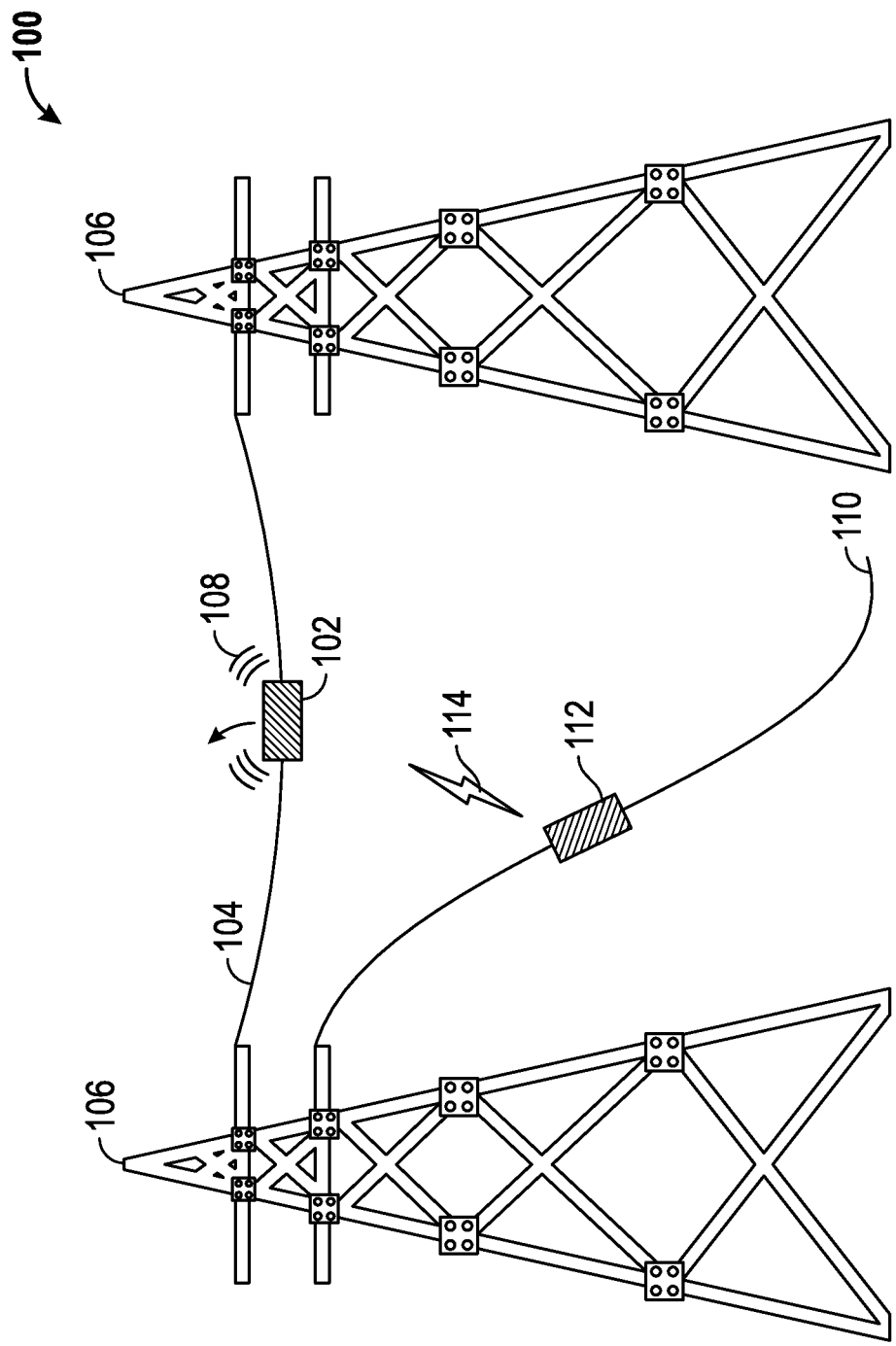
FIG. 1B is a schematic diagram of an acceleration sensor system for monitoring line motion, including an monitoring device, suspended and fallen power lines, and power transmission towers, shown according to an exemplary embodiment.

Referring to FIG. 1B, line motion detection system 100 is shown according to an exemplary embodiment. FIG. 1B is generally the same line motion detection system 100 as described in FIG. 1A. However, FIG. 1B depicts a system in which one of power lines 104 has failed and fallen to the ground. In this situation, monitoring device 112 responds to fallen line 110. Monitoring device 112 is shown as transmitting signal 114. As an example, signal 114 may be a warning signal sent to a control center, such as one associated with the line operator, with local public safety authorities, with a fire department, or the like. As another example, signal 114 may be a control signal used by a receiving device to automatically depower fallen line 110. As another example, signal 114 may contain information for load devices, alerting such devices of a potential power surge or loss of power.

Figure 2:
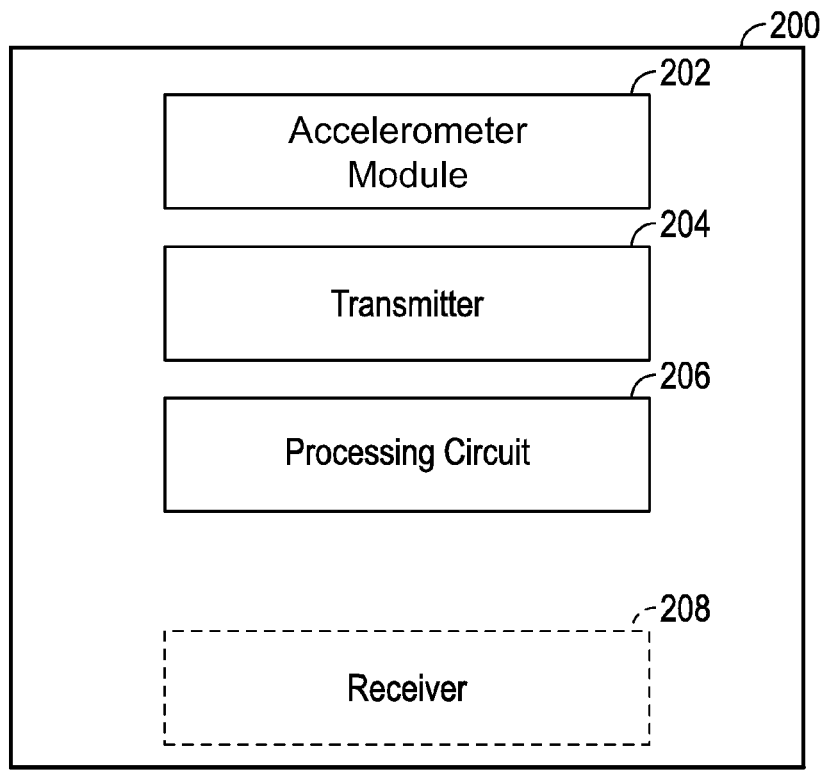
FIG. 2 is a block diagram of a monitoring device, an accelerometer, a transmitter, a processing circuit, and a receiver, shown according to an exemplary embodiment.

Referring to FIG. 2, a block diagram of monitoring device 200 for executing the systems and methods of the present disclosure is shown. Monitoring device 200 includes accelerometer module 202, transmitter 204, and processing circuit 206. Accelerometer module 202 is generally configured to measure acceleration and contains at least one accelerometer. Accelerometer module 202 is further configured to detect the magnitude and direction of acceleration, and provide measured values to processing circuit 206. Accelerometer module 202 may be configured for a single axis or for multiple axes. Accelerometer module 202 may contain multiple accelerometers, and may measure both linear and angular acceleration. Accelerometer module 202 may contain additional components for maintaining angular references (e.g., a gyroscopic device). Measured acceleration may be provided to processing circuit 206 as digital values or analog values, and may be in vector form, etc. Monitoring device 200 may additionally include receiver 208. Receiver 208 is generally configured to receive signals from another device. As an example, receiver 208 may be a wireless receiver configured to receive signals from a control center. As another example, receiver 208 may be a wireless receiver configured to receive signals from another monitoring device. While depicted as separate modules in FIG. 2, accelerometer module 202, transmitter 204, processing circuit 206, and receiver 208 may be part of one integrated device.

In an exemplary embodiment, monitoring device 200 is coupled to a high voltage transmission line. Accelerometer module 202 includes a three axis linear accelerometer and a gyroscope. Transmitter 204 is a long range radio transmitter. Receiver 208 is an antenna. Accelerometer module 202 provides acceleration and rotation information to processing circuit 206. Processing circuit 206 analyzes the data according to the systems and methods herein. Processing circuit uses transmitter 204 to send status reports to a control center. Processing circuit uses receiver 208 to obtain configuration information from the control center.

In another exemplary embodiment, monitoring device 200 is coupled to a high voltage transmission line. Accelerometer module 202 includes a three axis linear accelerometer and rotational accelerometer. Transmitter 204 is a long range radio transmitter. Receiver 208 is an antenna. Accelerometer module 202 provides acceleration and rotation information to processing circuit 206. Processing circuit 206 analyzes the data according to the systems and methods herein. Processing circuit uses transmitter 204 to send status reports to other monitoring devices. Processing circuit uses receiver 208 to obtain configuration information from a control center. It should be understood that accelerometer module 202 is not limited to a particular selection of accelerometer devices. Various accelerometer and motion detecting devices are envisioned.

Figure 3:
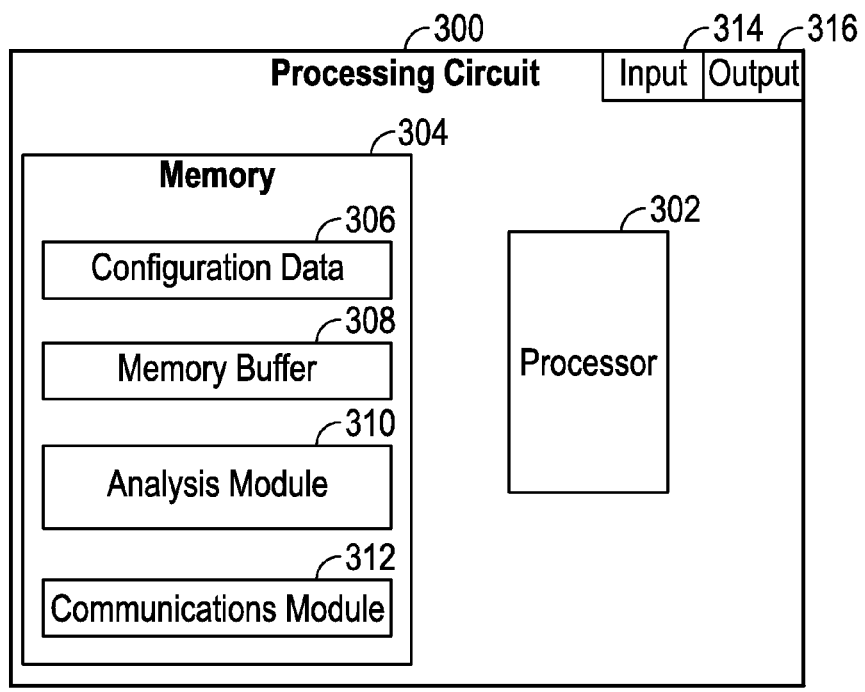
FIG. 3 is a detailed block diagram of a processing circuit, shown according to an exemplary embodiment.

Referring to FIG. 3, a more detailed block diagram of processing circuit 300 for completing the systems and methods of the present disclosure is shown, according to an exemplary embodiment. Processing circuit 300 may be processing circuit within monitoring devices 102 of FIG. 1. Processing circuit 300 is generally configured to accept data from an accelerometer (e.g., accelerometer module 202 of FIG. 2), determine displacements along the line, analyze the received data to determine characteristics of line motion, and determine if any action needs to be taken based on the data. Input may be received continuously or periodically. In one embodiment, processing circuit 300 receives data corresponding to the acceleration of a falling power line. Processing circuit 300 analyzes the data and confirms that the line is falling. Processing circuit 300 may determine that a variety of actions need to be taken in response to the falling line. As an example, the actions may include generating the signals necessary to depower the line prior to the line impacting the ground. Processing circuit 300 may cause the signals to be transmitted to a receiving device or control room. As another example, processing circuit 300 may generate signals necessary to warn other devices of an impending loss of power or power surge. As another example, processing circuit 300 may generate signals necessary to control active damping devices (e.g., aerodynamic devices, lifting or drag surfaces, fans, line tensioners, magnets, etc.) The active damping devices may apply damping forces to oppose the oscillations. Processing circuit 300 may also generate signals to cause the active damping devices to apply forces at discrete sites along the line, or at locations based on an oscillation mode or shape of the line, etc.

In another embodiment, processing circuit 300 receives data corresponding to the oscillations of a power line. Processing circuit 300 analyzes the data and determines displacements along the line. Processing circuit 300 analyzes the displacement data and determines line clearances along the line. Processing circuit 300 may compare the line clearance information to the locations of external objects (e.g., vegetation, the ground, external structures, etc.). The locations may be acquired from a camera, from radar, or from other sensors. The locations may be stored in a digital file, such as a 2D or 3D map file, a database, or other format. The locations may be transmitted to a monitoring device containing processing circuit 300 and processing circuit 300 may add or update stored locations. The clearance information may represent the closest three dimensional approach of the oscillating line to an external object. The effect of an oscillation upon clearance from an external object will generally depend upon the location of a given line displacement along the span of the line, i.e., the maximum deflection may occur at mid-span, but not limit clearance requirements due to an absence of nearby external objects at the mid-span location; however a smaller displacement close to one tower may be more limiting because of a nearby external object. Processing circuit 300 may also compare the line clearance information to a configuration file storing maximum displacement tolerances. As an example, processing circuit 300 may determine that a line is oscillating in a manner that is likely to cause the line to contact an external object. Processing circuit 300 may generate necessary signals to transmit a report of this information to a receiving device. As another example, processing circuit may log displacement information data over time. The logged data may be transmitted to a second device for use in determining a need to trim vegetation, or for use in better arranging the placement of the lines, etc.

Processing circuit 300 includes processor 302. Processor 302 may be implemented as a general purpose processor, an application specific integrated circuit (ASIC), one or more field programmable gate arrays (FPGAs), a group of processing components, or other suitable electronic processing components. Processing circuit 300 also includes memory 304. Memory 304 is one or more devices (e.g., RAM, ROM, Flash Memory, hard disk storage, etc.) for storing data and/or computer code for facilitating the various processes described herein. Memory 304 may be or include non-transient volatile memory or non-volatile memory. Memory 304 may include database components, object code components, script components, or any other type of information structure for supporting the various activities and information structures described herein. Memory 304 may be communicably connected to the processor 302 and include computer code or instructions for executing the processes described herein.

Memory 304 includes configuration data 306. Configuration data 306 includes data relating to processing circuit 300. For example, configuration data 306 may include information relating to interfacing with an accelerometer. This may include the command set needed to interface with transmitter and receiver components, for example a radio transmitter, an antennae, etc. Configuration data may include specification and protocol information for the components of an monitoring device as described herein. As another example, configuration data 306 may include information relating to tolerances or error levels, which may be used in determining when an action needs to be taken. Configuration data 306 may include data to configure the communication between the various components of processing circuit 300, and the various components of the systems described herein.

Configuration data 306 may further include information relating to external objects. For example, this may include locations of trees, houses, structures, vegetation, other power lines, power transmission towers, etc. This location data may reside in a database, a digital 2D or 3D map, a text file, or the like. Configuration data 306 may provide this information to Analysis module 310 for processing. Configuration data 306 may further include information relating to tolerances and error conditions. Configuration data 306 may provide this data to analysis module 310 for use in determining if a dangerous line condition is present, or for determining if a warning needs to be transmitted, etc. Configuration data 306 may also include location information of the corresponding monitoring device.

Memory 304 includes memory buffer 308. Memory buffer 308 is configured to receive data from an accelerometer module, (e.g. accelerometer module 202 of FIG. 2) through input 314. Memory buffer may also receive data through input 314 from other components within a monitoring device. The data may include information provided by a second device. For example, the data may include configuration or initialization data sent from a control center. As another example the data may be data sent from a second monitoring device. Data received through input 314 may be stored in memory buffer 308 until memory buffer 308 is accessed for data by the various modules of processing circuit 300. For example, analysis module 310 may access configuration data that is stored in memory buffer 308.

Memory 304 includes analysis module 310. Analysis module 310 is configured to receive line motion data from an accelerometer device (e.g. accelerometer module 202 of FIG. 2). The line motion data may be provided through input 314 or through memory buffer 308. Analysis module 310 scans the line motion data and analyzes the data. Analysis module 310 determines actions to take in response to the analysis. For example, the actions may include logging the data, transmitting the data, sending warning or alert signals, determining line displacements and clearances, enable damping devices, etc. Analysis module 310 may provide data to be formatted for transmission by communications module 312. Analysis module 310 module may use any number of techniques as it performs analysis as described herein. For example, analysis module may make use of machine learning, artificial intelligence, interactions with databases and database table lookups, pattern recognition and logging, intelligent control, neural networks, and fuzzy logic, etc.

In one embodiment, analysis module 310 receives line motion data from an accelerometer module and determines vibrational amplitudes of an overhead line. Line motion may be induced by wind, line or tower failure, etc. The scope of the present disclosure is not limited to a certain cause of line motion. Analysis module 310 uses the line motion data to calculate vibrational amplitudes along the line. Analysis module 310 uses the vibrational amplitude information to determine line clearances from external objects. The clearances may be determined at general locations along the line length, not simply at mid-span. To determine line clearances from external objects, analysis module 310 may use its positional information (e.g., the location of the accelerometer along the line) in calculating displacements and characterizing motion of the line. Analysis module may also access configuration data 308 to retrieve a data structure containing location information relating to external objects. Analysis module 310 also uses the line motion data to determine excitations of line vibrational modes. For example, this may include calculations relating to a line's normal mode and relating to standing waves along the line. This may also include determining amplitudes of the vibrational modes. Analysis module 310 may use the line vibrational mode information to predict line displacements at distal sites along the line. Analysis module 310 may store the vibrational mode information and utilize prior knowledge of modes in predicting future displacements. Analysis module 310 may determine displacements as a function of distance along the line, as opposed to only determining peak modal displacements. Analysis module 310 may determine displacements due to time varying superposition of modal displacements.

Analysis module 310 may compare the line displacement information to external object locations and provide line clearance information. For example, analysis module 310 may compare the maximum displacement of a certain location on the line to a location of a nearby tree. In one embodiment, the comparison information may be provided to a second device or control center, and be used in determining a need to trim vegetation or decrease line sag. For example, analysis module 310 may provide information that the line's movement exceeded a certain tolerance level (e.g., the line was within 5 ft. of the tree, etc.). As another example, analysis module 310 may provide information that the line's movement did not exceed a certain tolerance level (e.g., the line never oscillated greater than a distance of 1 foot, etc.). Tolerance levels may be specified by configuration data 308. In another embodiment, the comparison information may be used to trigger real time action. For example, if the line exceeds a certain tolerance, analysis module 310 may provide signals necessary to reduce the power or depower the line.

In one embodiment, analysis module 310 receives line motion data from both an accelerometer module and a second monitoring device (e.g., monitoring device 200 of FIG. 2), determines vibrational amplitudes of an overhead line using the received data, and uses the vibrational amplitude information to determine line clearances from external objects as described herein. Analysis module 310 may perform integration on received motion information to determine positional information. Analysis module 310 uses the data from the second monitoring device in determining dynamic clearances. For example, if the second monitoring device is coupled to a second line, analysis module 310 may dynamically calculate the distance between the lines. Analysis module 310 determines lines clearances. Analysis module 310 uses the motion information from the second monitoring device to confirm any determined actions. As an example, displacement information sent from the second monitoring device may be confirmed in order to avoid a false alarm.

In one embodiment, analysis module 310 receives line motion data from an accelerometer module for real-time detection of a falling line. Analysis module 310 may detect the falling line based on integration of the motion data (e.g., data corresponding to acceleration) to determine a distance excursion over time. The falling line may be caused by an actual breakage of the line, or failure of the line's supports, etc. The distance excursion can involve vertical or lateral motion. Analysis module 310 may compare the distance excursion to a tolerance level specified in configuration data 308. As one example, analysis module 310 may determine the line has moved a vertical distance greater than the tolerance level, and may infer that the line is falling. In one embodiment, analysis module 310 predicts the time-to-impact based on a line height or distance and the motion data. In another embodiment, analysis module 310 detects the actual line impact using the motion data. For example, the motion data may correspond to a large magnitude, but short duration, acceleration pulse followed by a continuing period with no acceleration. Analysis module 310 may determine to take real-time action based on a falling line. As an example, analysis module 310 may generate the necessary signals to transmit an impact report to a control center (e.g., associated with the line operator, with public safety organizations, etc.). As another example, analysis module 310 may generate the necessary signals to enable a crowbar circuit to automatically depower the line. In yet another example, analysis module 310 may generate the necessary signals to cause another device to depower the line (e.g., transmitting an alert or control signal, etc.). Analysis module 310 may transmit such an alert or control signal prior or after line impact. Communications module 312 may prepare any data provided by analysis module 310 for transmission. In yet another example, analysis module 310 may transmit a signal warning of an imminent loss of power or power surge.

In one embodiment, analysis module 310 receives line motion data from an accelerometer module to control active damping of the line motion (e.g., oscillations, vibrations, etc.). Analysis module 310 uses the line motion data to determine excitation of cable vibrational modes. In addition to determining displacements and vibrational modes of the line as described herein, analysis module 310 calculates displacements at the location of the damping devices. Analysis module 310 determines whether the line requires damping. As an example, if the line's displacement or velocity at a certain location exceeds a tolerance level, analysis module 310 may generate the necessary signals to control a damping device. A damping device may be any number of damping devices (e.g., line tensioners, fans, controlled magnets, stays, aerodynamic devices, articulated lifting or drag surfaces, etc.). The scope of the present disclosure is not limited to a certain damping device. Analysis module 310 transmits signals to cause the damping device to apply damping forces to oppose oscillatory velocity. Analysis module 310 may use data corresponding to the line analysis described herein (e.g., displacement calculations, velocity calculations, vibrational mode calculations, mode shape calculations, etc.) in determining locations and magnitude of damping forces to be applied. In one embodiment, analysis module 310 receives additional line motion data from a second monitoring device (e.g., monitoring device 200 of FIG. 2) in controlling the active damping of line motion. Analysis module 310 may transmit information corresponding to any damping applied. For example, analysis module 310 may send a status report of damping applied to a control center.

Memory 304 further includes communications module 312. Communications module 312 is configured to provide communication capability with other devices via output 316. As an example, communications module 312 may be configured to provide information corresponding to logged line oscillations (e.g., excitation of cable vibrational modes, amplitudes, displacements, line clearances, etc.). The other device may be a control center, a server, another monitoring device, etc. Communications module 312 may include logic for supporting various communications protocols (e.g., internet protocol (IP), transmission control protocol (TCP), file transfer protocol (FTP), radio transmissions, etc.) or supporting server-client or peer-to-peer network relationships.

Processing circuit 300 further includes input 314 and output 316. Input 314 is configured to receive accelerometer module data, configuration information, and any other suitable data. Output 316 is configured to provide output to a device as described herein. For example, output 316 may be configured to connect to other devices via a wireless transmission. Output 316 may also be configured to connect to a second device via a wired connection (e.g., sending transmissions along a line, etc.).

Figure 4:
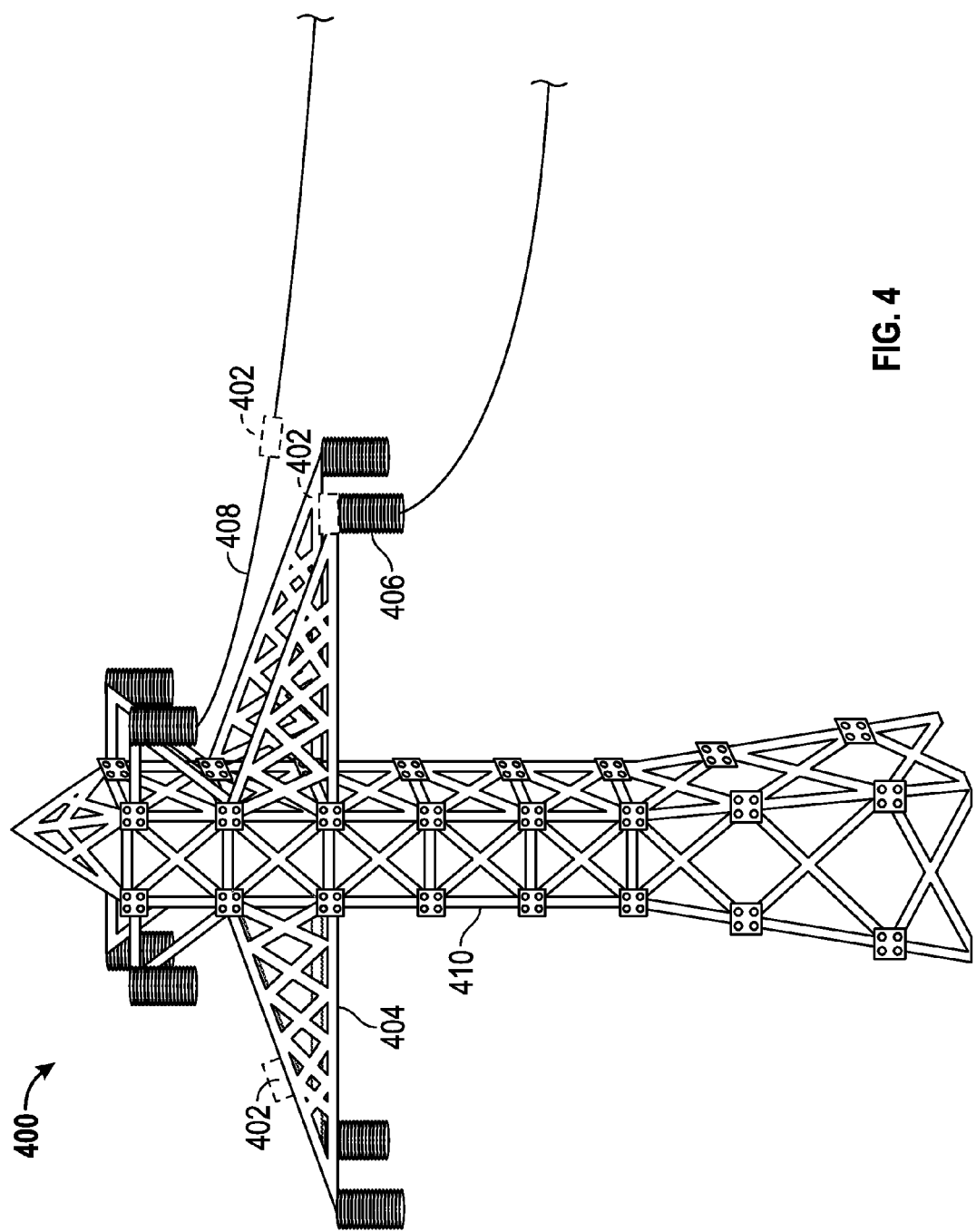
FIG. 4 is a schematic diagram of an acceleration sensor system for monitoring line motion, including monitoring devices, suspended power lines, and a power transmission tower, shown according to an exemplary embodiment.

Referring to FIG. 4, line motion detection system 400 is shown according to an exemplary embodiment. Line motion detection system 400 includes monitoring devices 402, power transmission tower 410, power line 408, insulator 406, and tower arm 404. Monitoring devices 402 may be configured as described herein (e.g., monitoring device 200 of FIG. 2). Monitoring devices 402 may be coupled to any appropriate location. For example, a monitoring device may be coupled to tower arm 404 or insulator 406 of transmission tower 410. As another example, a monitoring device may be coupled to power line 408. Such monitoring devices may be configured to communicate with each other to according to the methods described herein. It should be understood that the present disclosure is not limited to monitoring devices at a certain location, and that other locations of monitoring devices are envisioned.

Figure 5:
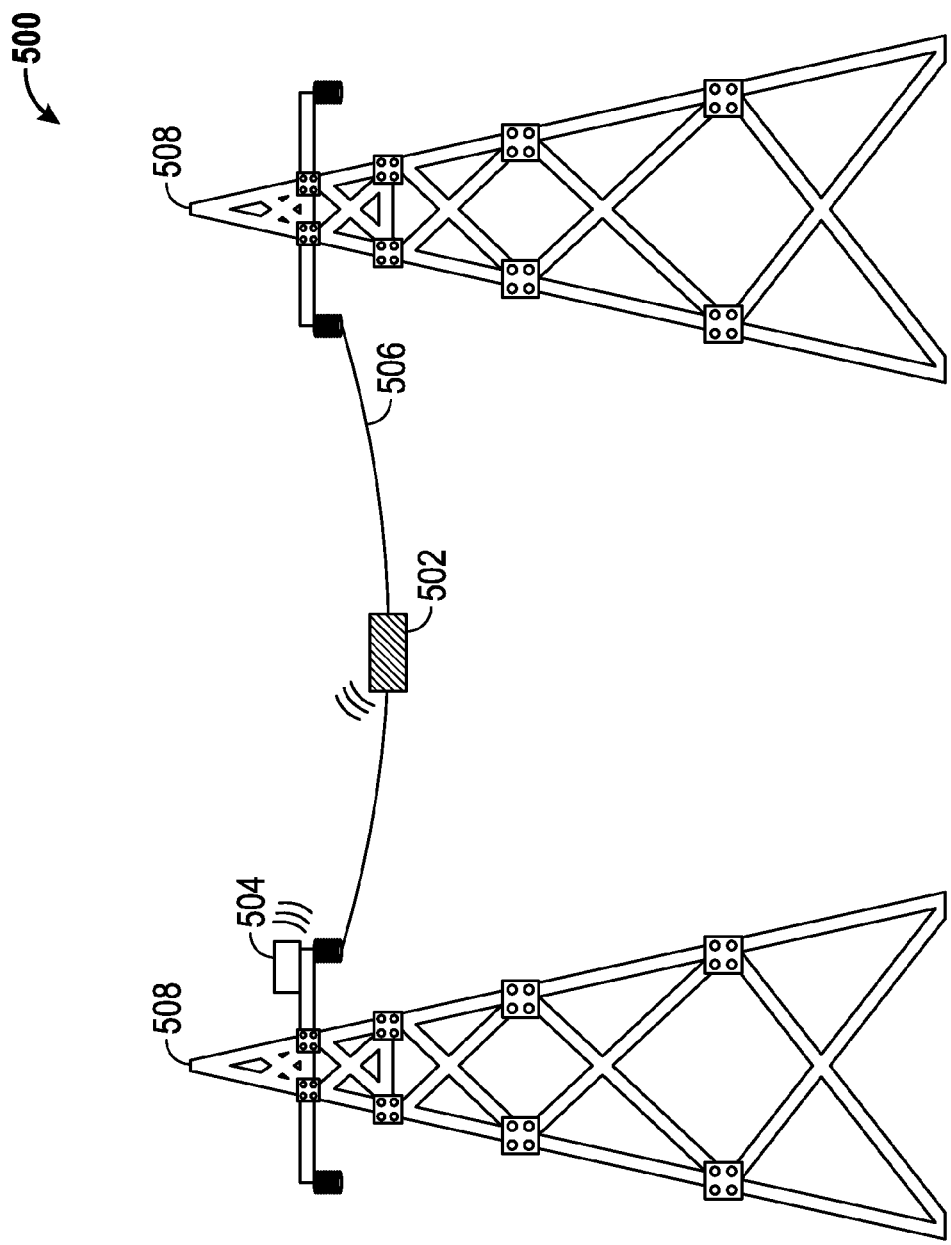
FIG. 5 is a schematic diagram of an acceleration sensor system for monitoring line motion, including a monitoring device, a suspended power line, a damping device, and power transmission towers, shown according to an exemplary embodiment.

Referring to FIG. 5, line motion detection system 500 is shown according to an exemplary embodiment. Line motion detection system 500 includes monitoring device 502, power transmission towers 508, power line 506, and damping device 504. Monitoring device 502 may be configured as described herein (e.g., monitoring device 200 of FIG. 2). Monitoring device 502 is depicted as transmitting a control signal to damping device 504. Damping device 504 receives the control signal from monitoring device 502 and applies forces to oppose oscillations or movements in line 506. As an example, damping device 504 may be a line tension device. The line tension device may increase or decrease the tension of a suspended line in response to a control signal. Monitoring device 502 may send a control signal in order to actuate the increase or decrease the tension in line 506, and thereby counteract an oscillation. As another example, damping device 504 may be an aerodynamic device capable of adjusting airflow or drag across the line. Monitoring device 502 may send a control signal to actuate the aerodynamic device to counteract or disrupt wind in order to impede line oscillations. Monitoring device 502 and damping device 504 may be physically coupled to each other or may be separate and communicate by wired or wireless signals.

Figure 6:
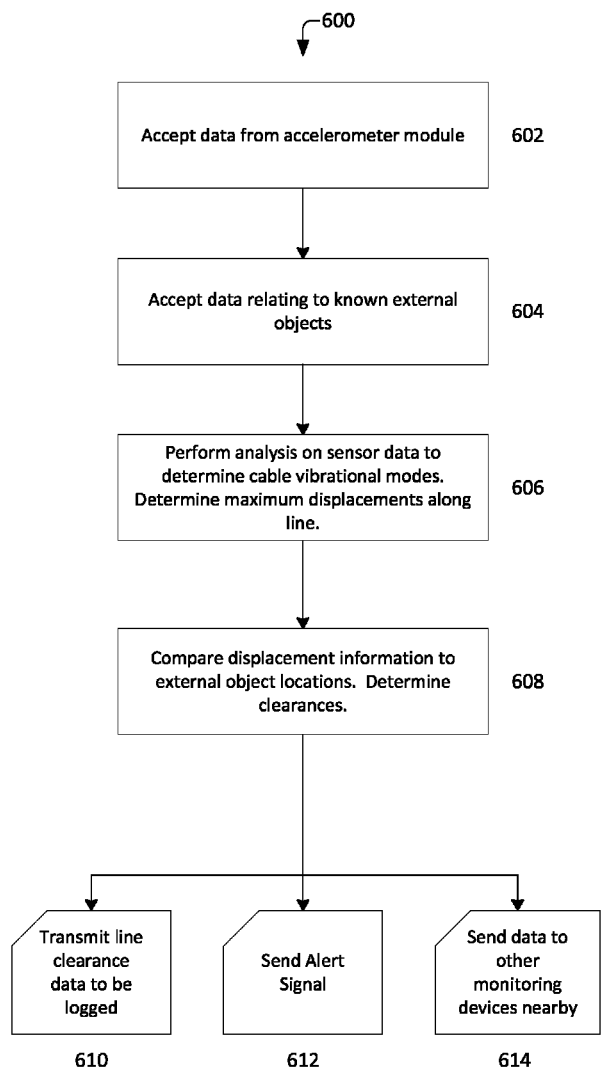
FIG. 6 is a flowchart of a general process for using a monitoring device to detect and respond to line motion, shown according to an exemplary embodiment.

Referring to FIG. 6, a flowchart of a general process 600 for using a monitoring device to detect and respond to line motion, shown according to an exemplary embodiment. Process 600 includes accepting data from an accelerometer module (e.g., accelerometer module 202 of FIG. 2, etc.) (step 602), accepting data relating to known external objects (step 604), performing analysis on the accelerometer module data to determine cable vibrational modes, including determining maximum displacements along the line (step 606), and comparing the displacement information to external object locations and determining line clearances (step 608). In response to the determined line clearances, an action may be taken (steps 610-614). For example, transmitting the line clearance information to be logged (step 610), sending an alert signal if necessary (step 612), or sending data to other monitoring devices (step 614). It should be understood that these actions may be combined, and multiple actions may be performed. It should be further understood that the actions are not limited to those mentioned in steps 610-614.

Figure 7:
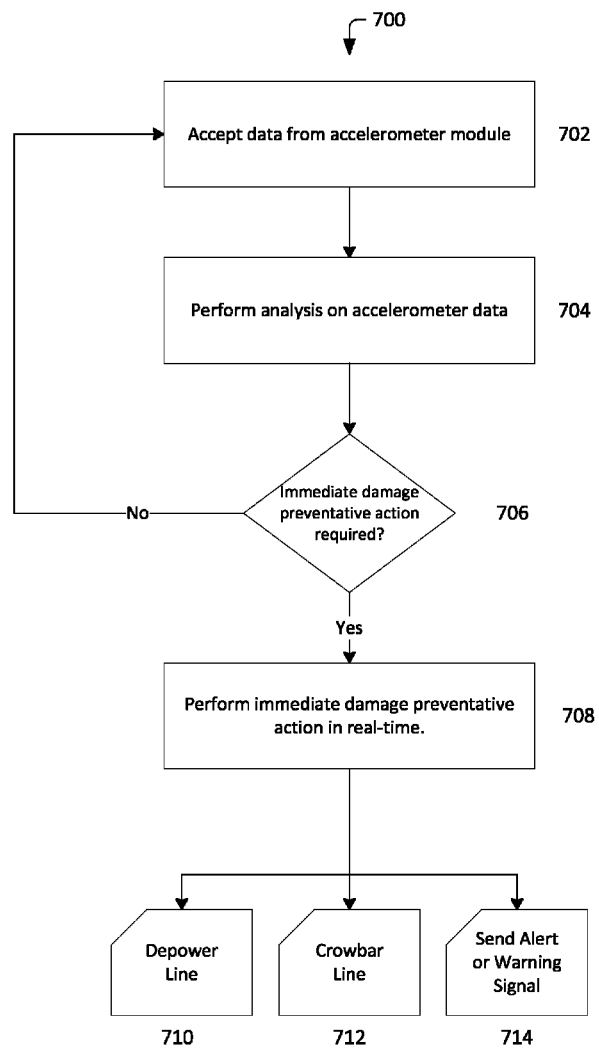
FIG. 7 is a flowchart of a general process for using a monitoring device to detect and respond to a falling line, shown according to an exemplary embodiment.

Referring to FIG. 7, a flowchart of a general process 700 for using a monitoring device to detect and respond to a falling line, shown according to an exemplary embodiment. Process 700 includes accepting data from an accelerometer module (e.g., accelerometer module 202 of FIG. 2, etc.) (step 702), performing analysis on the accelerometer module (step 704), and determining if immediate damage-preventative action is required (step 706). If immediate damage-preventative action is required then perform one, or multiple, real-time actions (step 708). Real-time actions include, depowering the line (step 710), crowbarring the line with a crowbar circuit (step 712), or sending an alert or warning signal (step 714), etc. It should be understood that these actions may be combined, and multiple actions may be performed. It should be further understood that the actions are not limited to those mentioned in steps 710-714.

Figure 8:
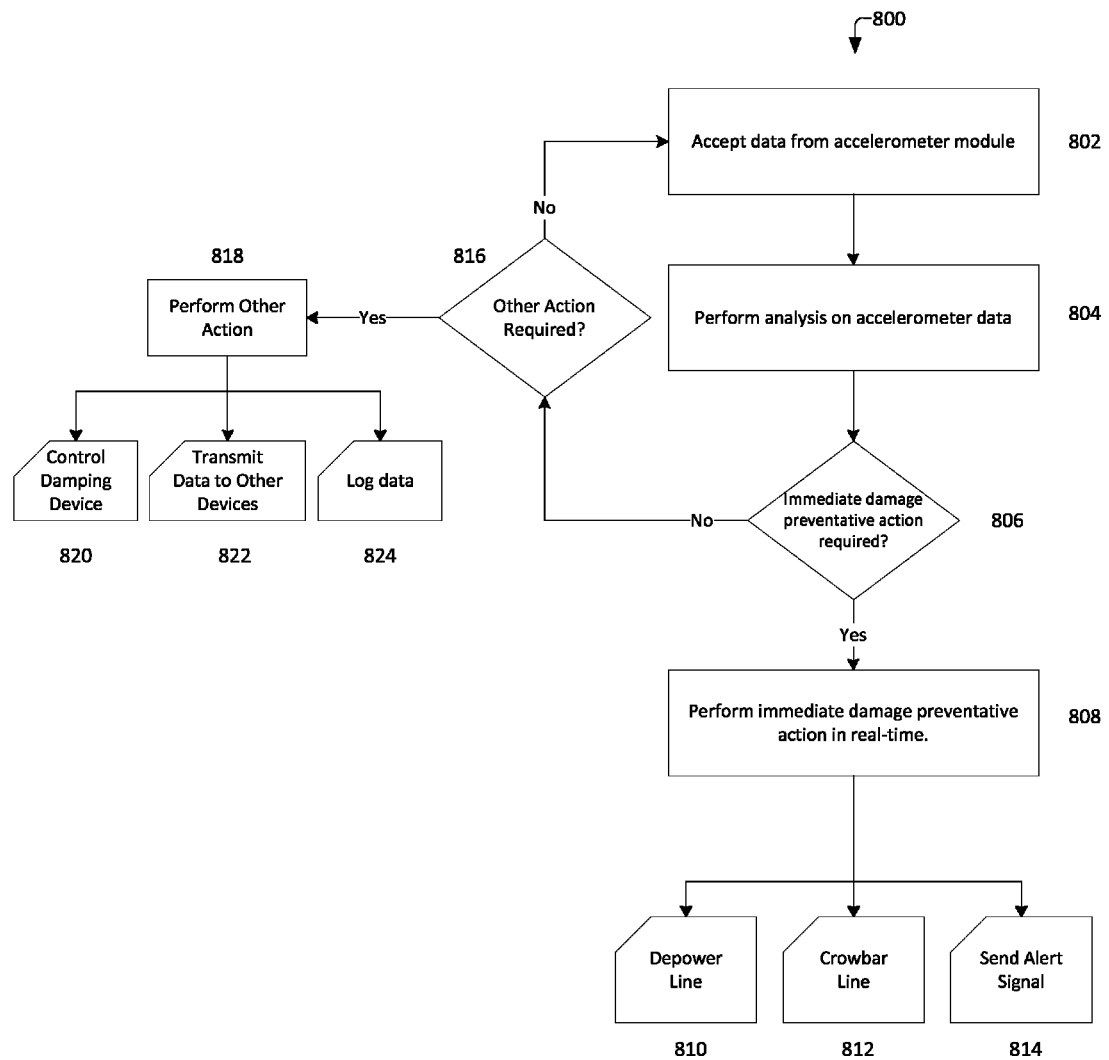
FIG. 8 is a flowchart of a general process for using a monitoring device to counteract line motion, shown according to an exemplary embodiment.

Referring to FIG. 8, a flowchart of a general process 800 for using a monitoring device to counteract line motion, shown according to an exemplary embodiment. Process 800 includes accepting data from an accelerometer module (e.g., accelerometer module 202 of FIG. 2, etc.) (step 802), performing analysis on the accelerometer module including determination line vibrational modes and maximum amplitudes (step 804), and determining if immediate damage-preventative action is required (step 806). If immediate damage-preventative action is required then perform one, or multiple, real-time actions (step 808). Real-time actions include, depowering the line (step 810), crowbarring the line with a crowbar circuit (step 812), or sending an alert or warning signal (step 814), etc. It should be understood that these actions may be combined, and multiple actions may be performed. It should be further understood that the actions are not limited to those mentioned in steps 810-814. If an immediate damage-preventative action is not required, other actions may be required (step 816). These actions (step 818) include, but are not limited to controlling a damping device (step 820), or transmitting data to another device (step 822), or logging the data (step 824), etc.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of monitoring line motion, comprising:
receiving data from an accelerometer corresponding to movement of an overhead line;
analyzing the data to determine displacement data corresponding to a displacement of the overhead line;
receiving data corresponding to a location of at least one external object proximate to the overhead line; and
analyzing the displacement data to determine a clearance from the at least one external object;
wherein the accelerometer is coupled to the overhead line; and
wherein determining displacement data includes determining amplitudes of vibrational modes.

2. The method of claim 1, further comprising using a transmitter to transmit the displacement data to a second device.

3. The method of claim 1, wherein receiving data from an accelerometer includes receiving data from multiple accelerometers, wherein the multiple accelerometers are coupled to multiple sites along the length of the overhead line.

4. The method of claim 3, wherein the sites are selected based on a modal shape of a vibrational mode of the overhead line.

5. The method of claim 1, wherein determining displacement data includes predicting a displacement at a distal site using the vibrational modes.

6. The method of claim 1, wherein determining displacement data includes determining a dynamic displacement due to superposition of the vibrational modes.

7. The method of claim 1, wherein determining displacement data includes determining a displacement as a function of distance along the overhead line.

8. The method of claim 1, wherein the external object includes at least one of vegetation, ground, a structure, and a second overhead line.

9. The method of claim 1, wherein determining a clearance includes using displacement data corresponding to a second overhead line sent from a second monitoring device.

10. The method of claim 1, wherein the clearance is a closest approach between a point on the overhead line and the external object.

11. The method of claim 1, wherein the clearance is a closest approach between a point on the overhead line and the external object during one or more vibrational periods of the overhead line.

12. A method of detecting a structural failure of a power line, comprising:
receiving data from an accelerometer corresponding to movement of a power line;
analyzing the data to determine distance excursion data;
analyzing the distance excursion data to determine whether the power line is falling; and
responding to a falling power line with a real-time action
wherein the accelerometer is coupled to the power line; and
where the real-time action includes depowering the power line prior to an impact.

13. The method of claim 12, wherein receiving data from an accelerometer includes receiving data from multiple accelerometers, wherein the multiple accelerometers are coupled to multiple sites along the length of the overhead line.

14. The method of claim 13, wherein the sites are selected based on a modal shape of a vibrational mode of the overhead line.

15. The method of claim 12, further comprising predicting an impact time.

16. The method of claim 12, further comprising detecting an impact of the falling line.

17. The method of claim 12, where the real-time action includes enabling a crowbar circuit coupled to the power line prior to an impact.

18. The method of claim 12, wherein the real-time action includes using a transmitter to send a warning signal.

19. The method of claim 18, wherein the warning signal comprises information corresponding to at least one of an imminent loss of power, a power surge, and impact information.

20. The method of claim 12, wherein the power line includes at least one of a power transmission line and a power distribution line.

21. A method of actively damping overhead line movement, comprising:
receiving data from an accelerometer corresponding to movement of an overhead line;
analyzing the data to determine displacement data corresponding to a displacement of the overhead line;
analyzing the displacement data to determine if the overhead line needs damping;
delivering control data to a damping device configured to reduce motion of the overhead line, wherein the control data is configured to control overhead line damping; and
damping the overhead line using the damping device;
wherein determining displacement data includes determining amplitudes of vibrational modes.

22. The method of claim 21, wherein the accelerometer is coupled to the overhead line.

23. The method of claim 21, wherein receiving data from an accelerometer includes receiving data from multiple accelerometers, wherein the multiple accelerometers are coupled to multiple sites along the length of the overhead line.

24. The method of claim 21, wherein determining displacement data includes predicting a displacement at a distal site using the vibrational modes.

25. The method of claim 21, wherein determining displacement data includes determining a dynamic displacement due to superposition of the vibrational modes.

26. The method of claim 21, wherein determining displacement data includes determining a displacement as a function of distance along the overhead line.

27. The method of claim 21, further comprising receiving displacement data corresponding to a displacement of a second overhead line, and wherein determining if the overhead line needs damping includes using the displacement of the second overhead line.

28. The method of claim 21, further comprising comparing the displacement data to location data corresponding to at least one external object.

29. The method of claim 21, further comprising comparing the displacement data to a threshold value.

30. The method of claim 21, wherein the damping device includes at least one of a device configured to adjust aerodynamics, a fan, a line tensioner, a controlled magnet, and a force-controlled coupling between the overhead line and an external structure.

* * * * *